United States Patent Office 2,867,502
Patented Jan. 6, 1959

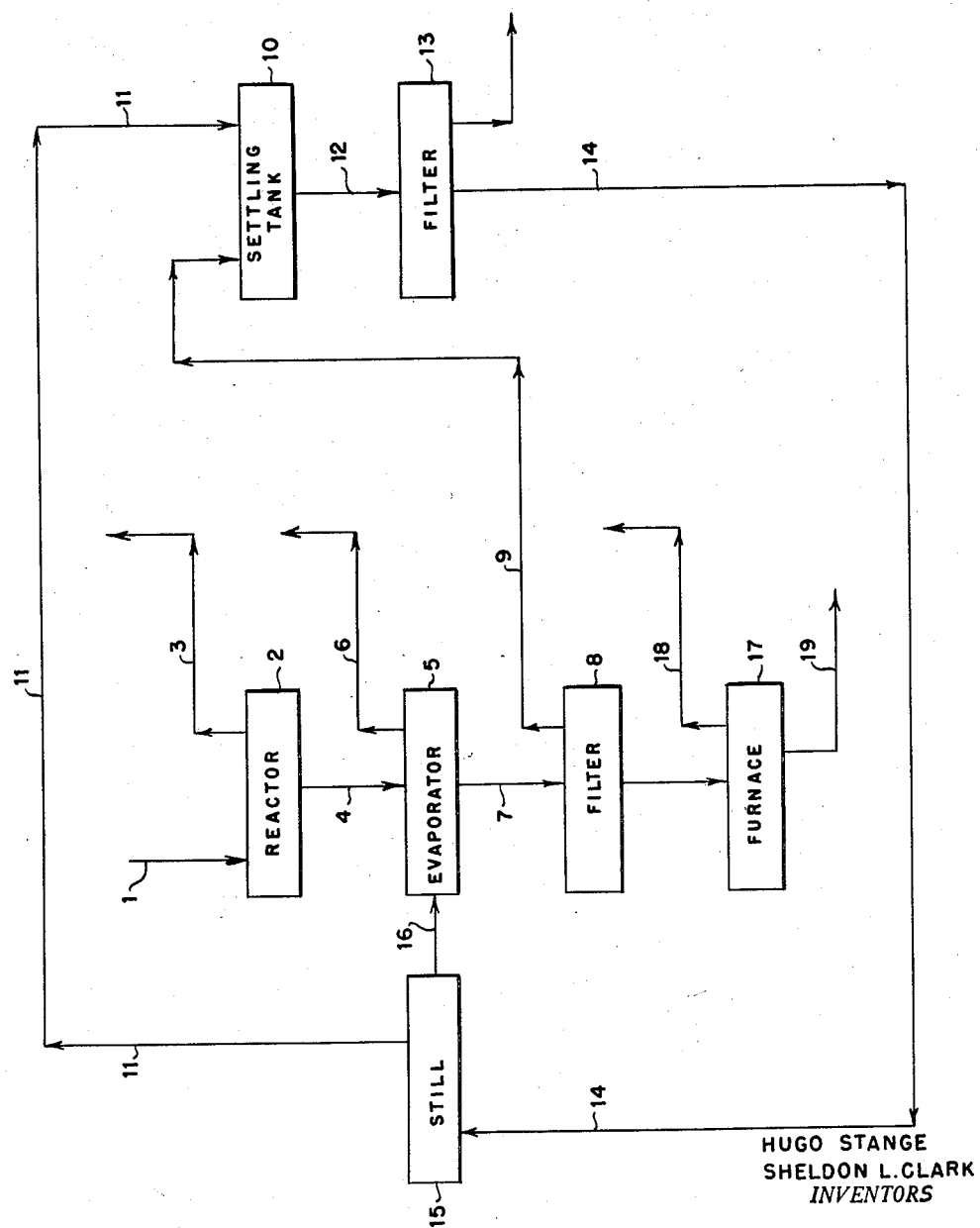

2,867,502

PRODUCTION OF AMMONIUM PENTABORATE AND BORIC OXIDE FROM BORAX

Hugo Stange, Niagara Falls, and Sheldon L. Clark, Tonawanda, N. Y., assignors, by mesne assignments, to Olin Mathieson Chemical Corporation, a corporation of Virginia Application August 16, 1954, Serial No. 449,922

8 Claims. (Cl. 23—59)

Our invention relates to a method for the conversion of borax to ammonium pentaborate and it also relates to a method for the conversion of borax to boric oxide.

Borax is a material which is readily available commercially, being prepared from boron-containing ores. Our invention provides the art with a means whereby borax can be conveniently and in high yield converted to certain other useful boron-containing compounds, namely ammonium pentaborate and boric oxide. Hence, our invention provides the art with a means whereby ammonium pentaborate and boric oxide can be readily prepared using boron-containing ores as a source.

Thus, in accordance with the overall process of our invention, we have discovered that ammonium pentaborate can be prepared by reacting borax and ammonium chloride in aqueous admixture, distilling the mixture until substantially all of the ammonia of reaction has been removed, precipitating ammonium pentaborate from the mixture, and then thermally decomposing the ammonium pentaborate thus produced to form boric oxide. Hence, in one aspect our invention provides a method whereby borax can conveniently be converted into ammonium pentaborate, a material which is useful in itself, and in another aspect our invention provides a means whereby ammonium pentaborate can be readily converted into boric oxide, another useful material.

Further in accordance with our invention, we have discovered a method whereby the mother liquor remaining after the precipitation of the ammonium pentaborate, such mother liquor containing dissolved therein additional quantities of ammonium pentaborate as well as sodium chloride, can be conveniently processed to remove sodium chloride therefrom placing it in condition such that the mother liquor can be recycled to the process in order that ammonium pentaborate dissolved in the mother liquor can be recovered. This is accomplished in accordance with our invention by admixing the mother liquor with a lower saturated aliphatic monohydric alcohol having from 2 to 4 carbon atoms, precipitating the sodium chloride, and then distilling the motor liquor to remove the alcohol overhead.

The following example is included to illustrate the practice of our invention and is to be considered not limitative.

EXAMPLE

The apparatus employed in the conversion of borax to ammonium pentaborate consisted of a three-necked, 1000 ml. flask, the center neck of which was equipped with a stirring assembly. A glass plug was fitted in one of the side necks. A simple distillation apparatus, consisting of a distillation head, a condenser, a connecting tube with a vacuum take-off and a single-necked 1000 ml. flask, all connected in series, was fitted in the other side neck. A magnetic stirring bar and standard acid used to measure the ammonia evolution were placed in the single-necked flask which was used as a receiver. A U-tube containing standard acid was attached to the vacuum adapter outlet by Tygon tubing.

In cycle No. I, borax (190.7 grams, 0.50 mole) and a 10 percent by weight aqueous solution of ammonium chloride (54.5 grams, 1.02 moles, dissolved in 490.5 grams of water) were placed in the flask. The solution was heated, and ammonia and water were distilled together at 98–100° C. into the receiver which contained 100 ml. of 6.025 normal hydrochloric acid. The amount of standard acid in the receiver was equivalent to 10.2 grams of ammonia. When the color of the methylene blue-methyl red indicator present in the standard acid solution changed from purple to green, the distillation was stopped. The distillation of the ammonia and water required about one hour.

The solution remaining in the flask after the ammonia removal was cooled to 60° C. and concentrated further by passing a stream of air over its surface. When approximately 50 additional grams of water had been removed by that technique, the solution became cloudy due to the formation of a white, crystalline precipitate. The slurry was stirred, cooled to 0° C. and filtered. The filter cake (unwashed) was dried in an oven at 90° C. The salt separated at this point was ammonium pentaborate analyzing 19.65 percent by weight of boron, 4.96 percent by weight of nitrogen and 31.02 percent by weight of $H_2O$. The theoretical values for $NH_4B_5O_8 \cdot 4H_2O$ are 19.89 percent by weight of boron, 5.15 percent by weight of nitrogen and 26.46 percent by weight of $H_2O$. 80 grams of the product contained 1.3 grams of sodium chloride. The ammonium pentaborate precipitate was also recrystallized twice and filtered from aqueous solutions which had been evaporated at 60° C. and cooled to 0° C. The twice recrystallized product was then dried in an oven at 90° C. and analyzed. It contained 19.14 percent by weight of boron, 4.87 percent by weight of nitrogen and 26.08 percent by weight of $H_2O$ and had a negligible chloride content. When the ammonium pentaborate precipitate formed by reacting the borax and ammonium chloride was recrystallized in the manner just described, except that the recrystallization solutions were evaporated at 100° C. and cooled to 25° C., analysis showed that the twice recrystallized salt contained 20.20 percent by weight of boron, 4.11 percent by weight of nitrogen and negligible chloride.

The mother liquor from the filtration was concentrated further by passing air over its surface until about 75 ml. of supernatant liquid remained over the salts (ammonium pentaborate and sodium chloride) which precipitated during the concentration. A solution containing 450 ml. of denatured alcohol (C. D. 13) and 50 ml. of ethyl acetate was prepared and divided into two equal portions. The first 250 ml. portion was added dropwise with stirring to the aqueous slurry and the resultant mixture was digested at 60° C. for a half hour. The second 250 ml. portion of the alcohol-acetate mixture was then added, following which the slurry was cooled to 20° C. and filtered. The filter cake (unwashed) was dried in an oven at 110° C. The salt separated at this point was sodium chloride.

A 0.865 gram sample of the ammonium pentaborate precipitate was placed in a porcelain crucible and heated to approximately 800° C. over a Meeker burner for two hours. The glassy residue was washed from the crucible with hot water. Analysis showed that the aqueous solution contained 0.91 gram of boric acid, which is equivalent to 0.51 gram of boric oxide. This amount represents a 93 percent by weight uncorrected yield of boric oxide.

The denatured alcohol and ethyl acetate were recovered together by distillation over a temperature range of 78 to 82° C. of the mother liquor remaining after the sodium chloride removal step, and the alcohol-acetate distillate so produced was used in the precipitation of sodium chloride in cycle No. II. The residue remaining after the removal of the alcohol and ethyl acetate by distillation contained sodium chloride and ammonium pentaborate and was added to the reaction mixture remaining after ammonia removal from the borax-ammonium chloride reaction mixture of cycle No. II. This procedure was repeated through five cycles, the data for which are shown in Table I in which the percentages are by weight.

tank 10 there is also introduced by means of line 11 a mixture of denatured alcohol and ethyl acetate. From settling tank 10 the reaction mixture passes by means of line 12 to filter 13 which serves to separate sodium chloride, leaving a mother liquor which is transferred by means of line 14 to still 15. From still 15 denatured alcohol and ethyl acetate are removed overhead through line 11 and residue passes by means of line 16 to evaporator 5. The ammonium pentaborate separated in filter Table I

| Cycle No. | Moles of borax | Moles of ammonium chloride (10% Aq.) | Data for the $NH_4B_5O_8 \cdot 4H_2O$ precipitate | | | | | Data for the NaCl Precipitate | | | | | |
|---|---|---|---|---|---|---|---|---|---|---|---|---|---|
| | | | Grams of ppt. | Percent B | Grams of $NH_4B_5O_8 \cdot 4H_2O$ | Percent purity | Percent yield | Grams of NaCl in ppt. | Grams of ppt. | Percent Cl | Grams of NaCl | Percent purity | Percent yield | Grams of $NH_4B_5O_8 \cdot 4H_2O$ in ppt. |
| I | 0.50 | 1.02 | 79.0 | 19.65 | 78.1 | 98.8 | 72.0 | 1.3 | 57.0 | 41.28 | 37.7 | 66.3 | 64.4 | 21.6 |
| II | 0.50 | 1.02 | 114.8 | 18.60 | 106.6 | 93.0 | 98.3 | 5.4 | | | | | | |
| III | 0.50 | 1.02 | 110.3 | 19.35 | 107.5 | 97.5 | 98.9 | 4.3 | 89.5 | 58.40 | 86.3 | 96.4 | 75.6 | 3.5 |
| IV | 0.50 | 1.02 | 112.3 | 19.35 | 109.2 | 97.3 | 100.5 | 3.2 | 69.5 | 54.64 | 62.5 | 90.0 | 106.8 | 7.1 |
| V | 0.50 | 1.02 | 105.8 | 19.97 | 106.0 | 100.0 | 97.6 | 3.2 | | | | | | |

Various modifications can be made in the procedures of the specific example to provide other embodiments which fall within the scope of our invention. Thus, the relative amounts of borax, ammonium chloride and water present in the initial reaction mixture are subject to some variation. Generally speaking, however, from about 2.0 to about 2.2 moles of ammonium chloride per mole of borax are used and the reaction mixture will generally contain ammonium chloride in an amount from about 5 to about 25 percent by weight, based upon the weight of ammonium chloride and water.

In the step in which the sodium chloride is precipitated, such step can be carried out by admixing the reaction mixture with a saturated aliphatic monohydric alcohol having from 2 to 4 carbon atoms, or a mixture thereof. Hence, in place of the denatured alcohol employed in the specific example there can be used normal propyl alcohol, isopropyl alcohol, isobutyl alcohol, or the like. The alcohol can be used alone or, as the specific example illustrates, it can be used together with up to about 25 percent by weight, based upon the weight of the alcohol, of an ester of a lower saturated monocarboxylic acid and a lower saturated monohydric alcohol or a mixture of such esters. The esters used are generally esters of acids containing from 1 to 3 carbon atoms and alcohols containing from 1 to 3 carbon atoms, such as methyl acetate, methyl propionate, ethyl propionate and the like, in addition to the ethyl acetate used in the specific example.

The decomposition of the ammonium pentaborate to form boric oxide can be effected by simply heating the ammonium pentaborate to an elevated temperature within the range from about 600 to about 1000° C., using procedures which are well known in the art.

The drawing sets forth an arrangement of apparatus in which our process can be carried out on a continuous basis to produce ammonium pentaborate and boric oxide, if desired. In carrying out the operation, an aqueous solution of ammonium chloride and borax is continuously fed by line 1 to reactor 2. A vapor stream of water and ammonia is removed from reactor 2 through line 3 and solution is removed through line 4 to evaporator 5 from which a stream of water vapor is removed through line 6. The liquid from evaporator 5 passes through line 7 to filter 8, which serves to separate precipitated ammonium pentaborate from a mother liquor which passes through line 9 to settling tank 10. Into settling 8 passes to furnace 17, suitably of a continuous type, from which water and ammonia vapors are removed through line 18 and boric oxide through line 19.

We claim:

1. A method for the conversion of borax to boric oxide which comprises reacting borax and ammonium chloride in aqueous admixture, distilling the mixture until substantially all of the ammonia produced in the reaction has been removed, precipitating ammonium pentaborate from the mixture and thermally decomposing the ammonium pentaborate to form boric oxide.

2. A method for the conversion of borax to ammonium pentaborate which comprises reacting borax and ammonium chloride in aqueous admixture, distilling the mixture until substantially all of the ammonia produced in the reaction has been removed, and precipitating ammonium pentaborate from the mixture.

3. A method for the production of boric oxide which comprises thermally decomposing ammonium pentaborate.

4. A method according to claim 3 in which the thermal decomposition is effected at a temperature within the range from about 600 to about 1000° C.

5. A method for the conversion of borax to ammonium pentaborate which comprises reacting borax and ammonium chloride in aqueous admixture, distilling the mixture until substantially all of the ammonia produced in the reaction has been removed, precipitating ammonium pentaborate from the mixture to provide a mother liquor containing ammonium pentaborate and sodium chloride dissolved therein, admixing the mother liquor with at least one saturated aliphatic monohydric alcohol having from 2 to 4 carbon atoms, precipitating sodium chloride from the mother liquor, and distilling the mother liquor to separate said alcohol therefrom.

6. A method according to claim 5 in which said alcohol is ethyl alcohol.

7. A method according to claim 6 in which the mother liquor, in addition to being admixed with ethyl alcohol, is also admixed with at least one ester of a lower saturated monocarboxylic acid and a lower saturated aliphatic monohydric alcohol in amount up to about 25 percent, based upon the weight of the alcohol.

8. A method according to claim 7 in which said ester is ethyl acetate.

No references cited.